(12) United States Patent
Sievert

(10) Patent No.: US 7,069,540 B1
(45) Date of Patent: Jun. 27, 2006

(54) COM PERSISTENCE MODEL

(75) Inventor: James A. Sievert, Lino Lakes, MN (US)

(73) Assignee: Unisys Corporation, Blue Bell, PA (US)

(*) Notice: Subject to any disclaimer, the term of this patent is extended or adjusted under 35 U.S.C. 154(b) by 790 days.

(21) Appl. No.: 09/897,552

(22) Filed: Jul. 2, 2001

(51) Int. Cl.
*G06F 9/44* (2006.01)

(52) U.S. Cl. ................................. 717/120; 717/116

(58) Field of Classification Search ............... 717/116, 717/165, 166; 719/315; 707/103 R
See application file for complete search history.

(56) References Cited

U.S. PATENT DOCUMENTS

| | | | | |
|---|---|---|---|---|
| 4,853,842 A | * | 8/1989 | Thatte et al. | 707/206 |
| 5,247,669 A | | 9/1993 | Abraham et al. | 707/103 |
| 5,297,279 A | * | 3/1994 | Bannon et al. | 707/103 R |
| 5,590,327 A | * | 12/1996 | Biliris et al. | 718/100 |
| 5,613,099 A | * | 3/1997 | Erickson et al. | 719/315 |
| 5,644,764 A | | 7/1997 | Johnson et al. | 707/103 |
| 5,682,536 A | * | 10/1997 | Atkinson et al. | 717/165 |
| 5,689,703 A | * | 11/1997 | Atkinson et al. | 707/103 R |
| 5,692,183 A | * | 11/1997 | Hapner et al. | 707/103 R |
| 5,765,039 A | | 6/1998 | Johnson | 719/328 |
| 5,794,256 A | * | 8/1998 | Bennett et al. | 707/206 |
| 5,805,896 A | * | 9/1998 | Burgess | 717/166 |
| 5,809,507 A | * | 9/1998 | Cavanaugh, III | 707/103 R |
| 5,864,866 A | * | 1/1999 | Henckel et al. | 707/103 R |
| 5,870,753 A | * | 2/1999 | Chang et al. | 707/103 R |
| 5,905,987 A | | 5/1999 | Shutt et al. | 707/103 |
| 6,052,528 A | * | 4/2000 | Dechamboux | 717/116 |
| 6,105,041 A | | 8/2000 | Bennett et al. | 707/206 |
| 6,125,364 A | * | 9/2000 | Greef et al. | 707/103 R |
| 6,128,771 A | * | 10/2000 | Tock et al. | 717/111 |
| 6,230,159 B1 | * | 5/2001 | Golde | 707/103 R |
| 6,301,582 B1 | * | 10/2001 | Johnson et al. | 707/103 R |
| 6,366,932 B1 | | 4/2002 | Christenson | 707/206 |
| 6,484,247 B1 | * | 11/2002 | Gendron et al. | 711/170 |
| 6,519,764 B1 | * | 2/2003 | Atkinson et al. | 717/120 |
| 6,769,124 B1 | * | 7/2004 | Schoening et al. | 719/316 |
| 2002/0062419 A1 | * | 5/2002 | Konson et al. | 711/5 |
| 2002/0184441 A1 | * | 12/2002 | Wong et al. | 711/113 |
| 2003/0163596 A1 | * | 8/2003 | Halter et al. | 709/315 |

OTHER PUBLICATIONS

Ranganathan et al., "Supporting Persistent C++ Objects in a Distributed Storage System", 1999.*

(Continued)

*Primary Examiner*—Kakali Chaki
*Assistant Examiner*—Trenton Roche
(74) *Attorney, Agent, or Firm*—Charles A. Johnson; Mark T. Starr; Crompton, Seager & Tufte, LLC

(57) ABSTRACT

Software and methods for extending preexisting objects to support persistence. One use of the present invention is to extend component object model (COM) objects to support persistence in a simple, predefined system. COM objects may be saved to persistence storage and loaded from persistence storage using user-provided save and load methods. When objects are constructed, the objects are added to a Persistent Object Registry. Objects preferably utilize smart pointers, rather than simple pointers, in order to enable restoration of the pointer values after a save and load cycle. The smart pointers include an object ID along with the address. The object ID, together with the information stored in the Persistent Object Registry, may be used to restore a pointer value after loading. Objects may be saved by streaming the objects out and loaded by streaming the objects back into memory from a file.

24 Claims, 7 Drawing Sheets

OTHER PUBLICATIONS

Sheetal Kakkad, "Address Translation and Storage Management for Persistent Object Stores", Dec. 1997.*

J. E. B. Moss, "Working with Persistent Objects: To Swizzle or Not to Swizzle", IEEE, Jul. 19, 1991.*

Dabbene et al., "Adding Persistence to Objects Using Smart Pointers", *Journal of Object-Oriented Programming*, vol. 8, No. 3, Jun. 1995, pp. 33-39.

http://www.microsoft.com/Com/news/drgui.asp, "Dr. GUI's Gentle Guide to COM", downloaded Jun. 3, 1999, 2 pages.

http://msdn.microsoft.com/library/welcome/dsmsdn/msdn_drguion020298.htm, "Dr. GUI on Components, COM, and ATL", downloaded Jun. 3, 1999, 49 pages.

http://msdn.microsoft.com/library/welcome/dsmsdn/DrGUI021099.htm, "Dr. GUI and COM Automation, Part 1", downloaded Jun. 3, 1999, 15 pages.

http://msdn.microsoft.com/library/welcome/dsmsdn/DrGUI032999.htm, "Dr. GUI and COM Automation, Part 2: COM's Cool Data Types", downloaded Jun. 3, 1999, 16 pages.

http://www.comdeveloper.com/articles/WhyATL.asp, "Why ATL? Why COM?", downloaded Jun. 3, 1999, 4 pages.

http://www.objectnews.com/com_glossary.htm, "COM Glossary", downloaded Jun. 3, 1999, 1 page.

http://www.safafyi.com/site/solution/som/entirex/dcom_gl.htm, "DCOM Glossary", downloaded Jun. 3, 1999, 2 pages.

http://www.usenix.org/publications/library/proceedings/coots97/full_papers/hamilton/smartp.html, "Montana Smart Pointers: They're Smart, and They're Pointers", downloaded Feb. 16, 2001, 51 pages.

http://ootips.org/yonat/4dev/smart-pointers.html, "Smart Pointers-What, Why Which?", downloaded Feb. 16, 2001, 10 pages.

* cited by examiner

OID for Adding a persistent object to a COM Persistent Object Controller

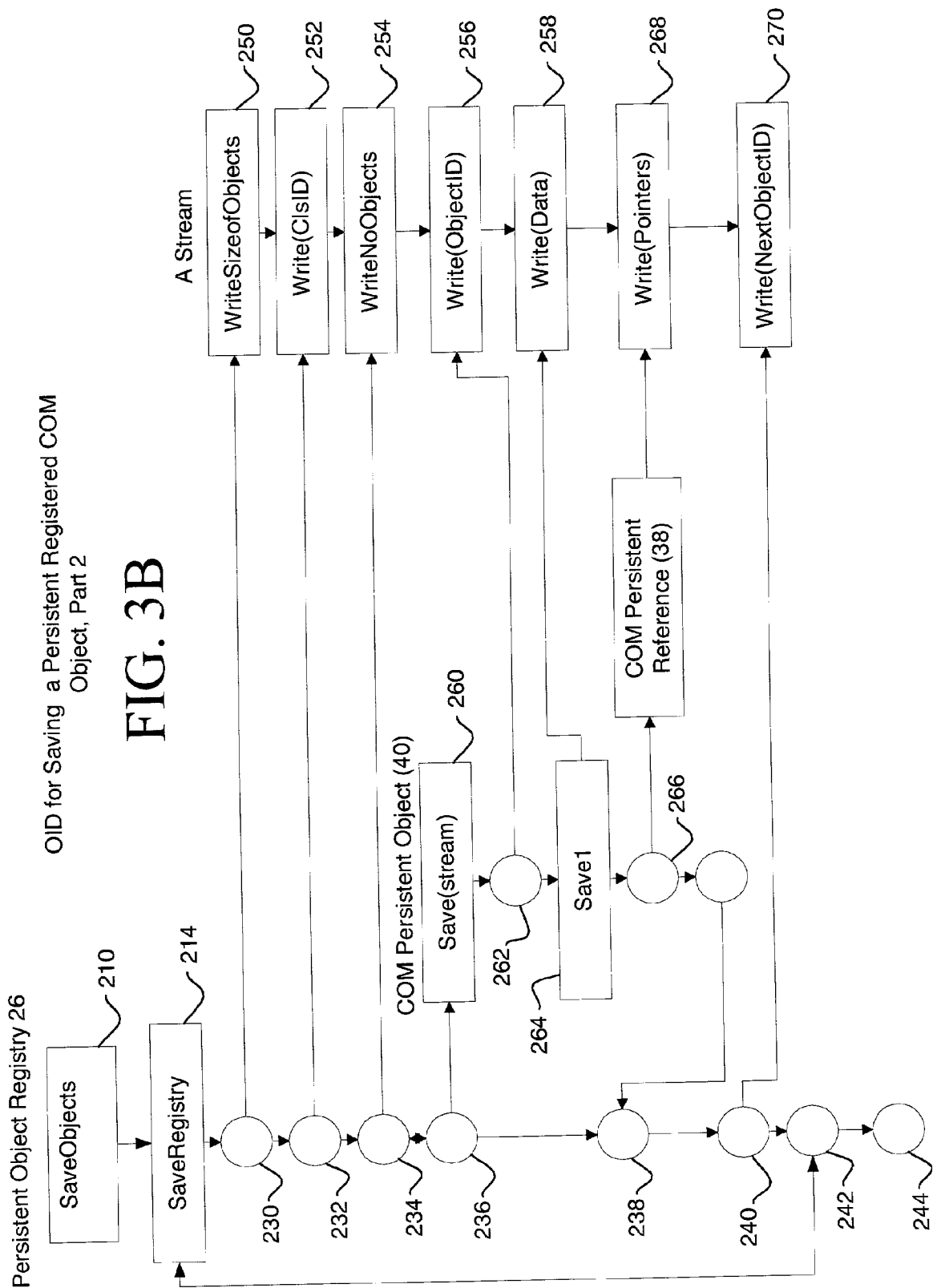

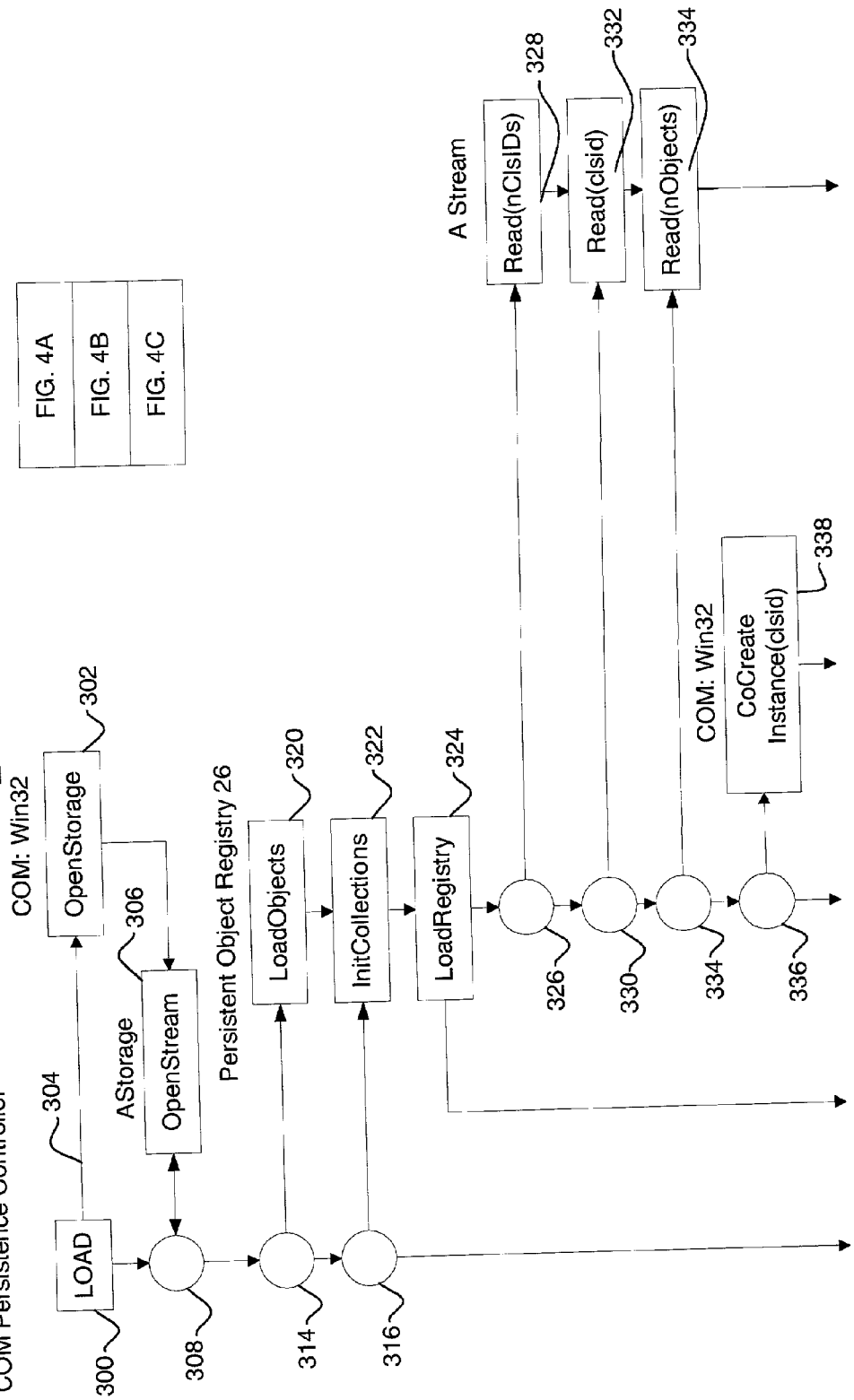

OID for Loading COM Objects from a storage into a COM Presistent Object Controller, Part 2

OID for Loading COM Objects from a storage into a COM Presistent Object Controller, Part 3

COM PERSISTENCE MODEL

FIELD OF THE INVENTION

The present invention is related generally to computer software and object oriented programming. More specifically, the present invention is related to software for persistently storing objects having pointers to other objects. The present invention includes software and methods for storing objects to persistent storage, storing pointers as unique identifiers, and restoring those pointers.

BACKGROUND OF THE INVENTION

Object oriented programming is well known and very well established. Examples of object oriented programming languages include C++ and Smalltalk. Object oriented programming may be viewed as including polymorphism and inheritance, along with some encapsulation and some late binding. Object oriented programming initially was expected to allow for a great deal of object re-use, where objects are created once, and shared or sold for less than the cost and uncertainty of developing the same or similar objects from scratch for different projects and within different organization. The promise of object re-use was not immediately realized. What little re-use was provided was often in the form of class source code in one language that would hopefully compile across multiple platforms.

Languages like C++ offer encapsulation, meaning the encapsulation of data, by separating the data from the access to that data. Encapsulation may be viewed as separating what an object looks like, e.g., the object interface, from how it actually works, e.g., the object implementation. C++ provides encapsulation, but in effect provides both interface and implementation simultaneously. Attempts have been made to separate the implementation from the interface, with varying degrees of success.

Object oriented programming provided more reusability with the advent of object-oriented programming that was more component oriented. Such component oriented programming may be viewed as including polymorphism, interface inheritance, very late binding, enforced encapsulation, and binary reuse. One commercial embodiment of component-oriented programming was Object Linking and Embedding (OLE), from Microsoft®. A later commercial embodiment of component oriented programming, derived from OLE, included Component Object Model (COM) objects, also provided by Microsoft®.

COM objects provided interfaces separate from implementation, and allowed for multiple interfaces to each object. COM objects support the IUnknown interface, among others. COM further supports the inheritance of interfaces. Interfaces can be added or extended by users, enhancing the reusability. Components created that derive from IUnknown must support the IUnknown interface, and can support other interfaces, which are defined in an Interface Definition Language (IDL). A developer can use a system such as COM to create objects which, when compliant with COM, can be created as binary objects, used, and extended by a purchaser or user on remote computers.

Binary objects having agreed upon and/or published interfaces can be created, used, and destroyed using these interfaces. Making the objects persistable is also desirable. Interfaces have been defined to make objects, for example, COM objects, to be persistently stored and restored from persistent storage. Due to the extensibility of the objects, while the interfaces are defined, the implementation is left to the developer of the COM compliant object. Storing and restoring objects can be less than straightforward as the objects often have points referencing other objects, which will be in different locations when restored, and may not be in existence at the point in time when the pointer value is to be restored.

What would be desirable, therefore, are methods and systems for providing persistent storage and retrieval for objects having pointers, and in particular, methods and systems for storing and restoring objects derived from component objects having defined interfaces.

SUMMARY OF THE INVENTION

The present invention is related generally to computer software for persistently storing objects having pointers to other objects. More specifically, the present invention is related to software and methods for storing objects to persistent storage, storing pointers as unique identifiers, and restoring pointers, while restoring those pointers by so sheathing the pointers to class identifiers and creating the objects pointed to not in existence at the time of pointer restoration. The present invention provides a systematic method and software system for extending preexisting classes to support persistent storage. The present invention includes methods for saving objects to storage and loading the stored objects from storage back into memory. The present invention further includes methods for restoring pointer values to their proper values after a save and load cycle. The present invention preferably uses save and load methods for streaming the user objects from memory to a file and from a file into memory. A preferred use of the present invention is to extend component object model (COM) objects to support persistence.

In one aspect of the present invention, objects are registered in a Persistent Object Registry, preferably at the time of construction. The registry can include a unique object identifier for each object, as well as the class ID of that object class, and the IUnknown object from which that object derives. In one embodiment, each class ID ("CLSID") is a 128-bit representation that uniquely identifies a COM class. The Persistent Object Registry preferably maintains a collection of pointers grouped by class ID, object ID, and IUnknown.

In another aspect of the present invention, pointers which are to be restored to proper values after a save and load cycle may utilize smart pointers. In another aspect of the present invention, objects utilize smart pointers rather than simple pointers. The smart pointers enable the restoration of pointer values after a save and load cycle. One embodiment of smart pointers includes a group ID, together with an address for the object being pointed to. In the C++ language, the assignment operator for pointers may be overloaded to make the smart pointers transparent to the person writing the code. During the assignment operation, the address of the object being pointed to is stored in a typical manner. In addition, the address of the object being stored is used to search the Persistent Object Registry to retrieve the object ID of the object being pointed to. In one embodiment, the object ID is retrieved directly from the object.

In yet another aspect of the present invention, user-supplied save methods are used to stream objects to persistent storage. In a preferred embodiment, the total number or numbers of classes having objects to be stored is written and/or the total size requirement of the objects to be stored is written. For each class to be written to persistent storage, the class ID of that class and the number of objects of that class to be stored are preferably written to persistent storage, followed by the actual data of those objects. The actual data streamed to persistent storage is ultimately performed by a user-provided save method. The objects to be written out may thus be grouped according to class with objects of a class being written sequentially, followed by objects of the next class.

In still another aspect of the present invention, a file to be loaded from persistent storage into memory may be loaded using the class ID of the COM persistence controller object used to control the saving of the objects to the file. The COM persistence controller object may first be constructed, together with the Persistent Object Registry. As each class ID is retrieved from the stream in, the objects of that class ID may be constructed and loaded. As the objects are loaded, they may be registered with the Persistent Object Registry in a manner similar to their initial construction and registration. The loaded objects may initially have invalid or null pointer values.

After a portion of loading has been completed, or all of loading has been completed, the smart pointers may be restored to include valid object addresses. The smart pointers, containing the object IDs of objects being pointed to, may be resolved by using the Persistent Object Registry to retrieve the address of the object being pointed to using the object ID of the object being pointed to. The valid address may thus be set in the smart pointer. In some embodiments, a counter is incremented to track the number of objects being registered. In one embodiment, the value of this counter is used to assign values of the counter to the objects and/or to be used in managing Persistent Object Registry. The counter can be saved to persistent storage to preserve the current state of the objects when stored, and later loaded and restored, thus keeping track of the number of objects before the save and load cycle.

BRIEF DESCRIPTION OF THE DRAWINGS

FIGS. 3A–3B are an illustrative object interaction diagram for saving a persistent registered COM object; and FIGS. 4A–4C are an illustrative object interaction diagram for loading COM objects from storage into a COM persistent object controller.

DETAILED DESCRIPTION OF THE INVENTION

Figure 1:
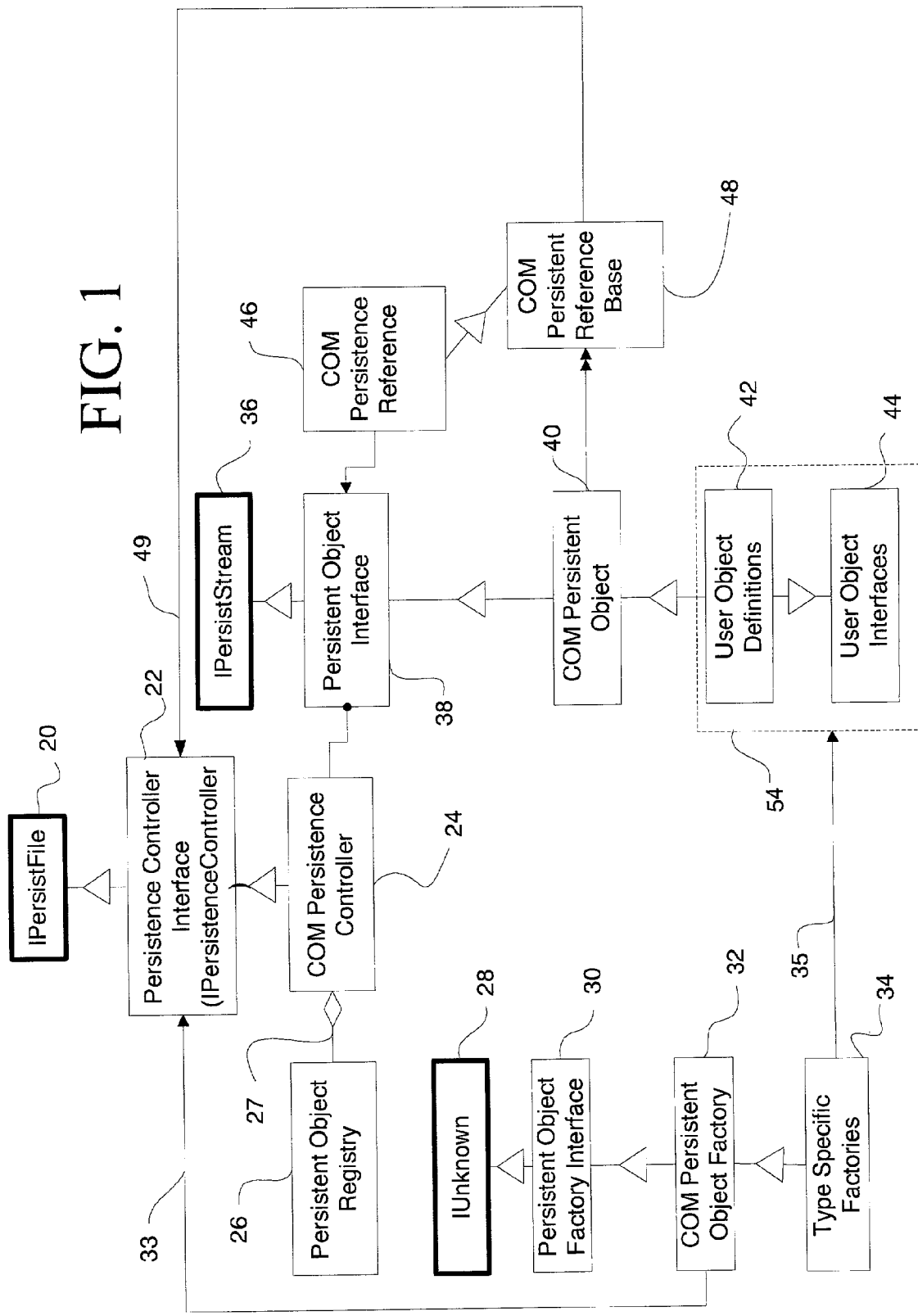
FIG. 1 is a class diagram of the classes used in an illustrative embodiment of the present invention.

FIG. 1 illustrates a class diagram of the classes used in an illustrative embodiment of the present invention. The three classes illustrated, including IPersistFile 20, IUnknown 28, and IPersistStream 36, are pre-defined by the COM (Component Object Model) specification, and classes defined according to the illustrative embodiment of the present invention are derived from these three basic classes. Persistent Object Factory Interface class 30 derives from IUnknown class 28 and exists in large part to provide the factory interface for IUnknown objects 28. COM Persistent Object factory 32 derives from Persistence Object Factory 32 and has Type Specific Factories 34 derived from COM Persistent Object Factory 32. Type Specific Factories 34 are well known in the art and can be used to create objects of the multiple classes the user chooses to create, and can be persistable according to the present invention.

A Persistence Controller Interface class 22 derives from IPersistFile 20 and defines the interface to IPersistFile 20. A COM Persistence Controller class 24 derives from Persistence Controller Interface 22. COM Persistence Controller class 24 serves to control the existence of objects registered to be persistable under the present invention. Class 24 serves to track the existence of objects registered to be persistable after the objects are constructed. Class 24 has a Persistent Object Registry class 26 which serves to store data for class 24. The relationship is indicated at 27. In some embodiments, the functionality of class 26 is replaced by a set of attributes residing within class 24 rather than a separate class.

A Persistent Object Interface class 38 derives from IPersistStream 36 and provides the interface to IPersistStream 36. A COM Persistent Object class 40 derives from Persistent Object Interface 38 and serves to define common attributes and methods for user defined objects which derive from it. All user-defined objects according to the illustrated embodiment derive from COM Persistent Object 40. User Object Definition classes 42 are derived from COM persistent Object class 40 and define the user objects which are to be persistable according to the present invention. User Object Interface classes 44 derive from User Object Definitions 42 and typically are paired together in a one-to-one relationship with the User Object Definitions 42. User Object Definitions classes 42 and User Object Interface classes 44 are grouped together at User Objects Definitions and Interfaces 54. There are typically as many different User Object Definitions as there are different user defined classes.

A COM Persistence Reference Class 46 resolves to Persistent Object Interface class 38. A COM Persistent Reference Base class 48 finds objects using Persistence controller Interface 22, indicated at 49. COM Persistence Reference class 46 derives from COM Persistence Reference Base 48, and has a one-to-one relationship with User Object Definitions and Interfaces 54.

When a user wishes to support persistence in user created COM objects, the user needs to write a code to create, save, and load methods to support streaming, as later described. The user need do little more than that to create persistent COM objects according to the present invention. The present invention may be described in three parts. COM objects are constructed according to Type Specific Factories 34 using User Object Definitions 42. The newly created objects are registered with the COM Persistent Controller 24 in the Persistent Object registry 26. The registered information is used later to save and load the objects. The COM objects thus registered may later be saved to persistent storage by streaming the objects to storage using Persistent Object Interface 38.

A user defined COM object can be added using User Object Definitions 42 and User Object Interfaces 44 to create objects using Persistent Object Factory Interface 30 and COM Persistent Object Factory 32 and Type Specific Factories 34 which derive directly or indirectly from IUnknown 28. A COM Persistent Object Factory 32 object sends a message to a Persistence Controller Interface 22 object to add the newly created object to the database of registered objects. The Persistence Controller Interface 22 object sends a message to a COM Persistence Controller object to register the newly constructed object. The object is added to the registry of objects within Persistent Object Registry. In one embodiment, the newly created object is stored or indexed three ways. The object may be indexed by Class ID, by Identity, and/or by IUnknown. The Class ID and Identity may be determined by the COM Persistence Controller sending a message to the Persistence Object Interface 38 which sends a message to the COM Persistent Controller 24. The newly constructed object is thus registered within the Persistent Object Registry 26.

User defined COM objects may use standard C or C++ language pointers. These pointers typically point to other objects. When these objects are saved and restored to memory, the objects will likely be in different memory locations. The pointer values will thus likely point to garbage values if restored, and are thus typically reset to a null value by the method of loading the saved object from persistent storage. User defined COM objects may also use smart pointers according to the present invention, which can be saved and restored to reflect the new locations of the objects pointed to after loading.

The smart pointers have been developed such that the use during coding is transparent to the person assigning and referencing smart pointer values. This is done in part by overloading the assignment operator. When a smart pointer is assigned the address of another object, the assignment operator uses the address of the object being pointed to, to retrieve the Class ID and Identity from the information registered for that object in the Persistent Object Registry class, and that information is stored as well. In particular, the object pointed to has the Class ID stored as well as the address. This information can be used when restoring the objects from persistent storage. In one embodiment, there is one COM Persistence Reference 46 object for each smart pointer in a user defined COM object.

When an object is stored to persistent storage, the Persistence Controller Interface 22 object sends a message to the COM Persistence Controller 24 object to save the object. The COM Persistence Controller 24 object creates a stream, and the objects are sent out to the stream, along with enough information to later restore the objects. The COM Persistence Controller 24 object may send messages to the Persistent Object Registry 26 object, instructing the Persistent Object Registry 26 object to stream out header data such as total number of objects, and instruct the Persistent Object Registry 26 object to send messages to the COM Persistent Controller 24 and COM Persistence Reference 46 objects to stream the objects out.

In one embodiment, the objects are arranged such that objects having the same Class ID are grouped together. In one method, the number of objects or total size of the objects for each ClassID are streamed out, followed by the stream for all objects having the same ClassID, typically prepended by the total number or total size of the objects for that ClassID. The stream may thus contain a nesting of the objects for each ClassID within each ClassID. The next object number that would be written, named "NextObjectID" in one embodiment, may also be streamed out.

When the objects are to be loaded from memory, the file name containing the objects to be restored has typically been associated with an executable portion of code, which may be a DLL (Dynamic Link Library) file. When the DLL is invoked, a COM Persistence Controller 24 object is created in memory. The COM Persistence Controller 24 object may be used to restore the saved objects to the state they were in previous to being saved. The COM Persistence Controller 24 objects will typically create storage to be used as a buffer to store the stream from the objects being restored.

The COM Persistence Controller 24 object may instruct the Persistent Object Registry 26 object to load, with each newly loaded object registered with the COM Persistence Controller 24 object and the Persistent Object Registry 26 objects as the objects are being loaded into memory. For each smart pointer in the objects, the smart pointers contain the Class ID and Identity of the object being pointed to. After the objects have been loaded, the address portions of the smart pointers may be restored as well by resolving the reference of the objects pointed to, and obtaining the current addresses, to be placed into the smart pointers as attributes. The Persistent Object Registry 26 object may send messages to the Persistence Object Interface 38 object to get the Class ID and Identity of the objects being referenced.

In one embodiment, the number of different ClassIDs in the stream is read first, then, for each different ClassID, the ClassID is read, followed by the number of objects of that ClassID, followed a read of enough of the stream to read in and load all objects of that ClassID. This is repeated for each different ClassID having objects in the stream. The objects are typically first loaded into memory, followed by the restoring of the smart pointer values in a separate pass.

Figure 2:
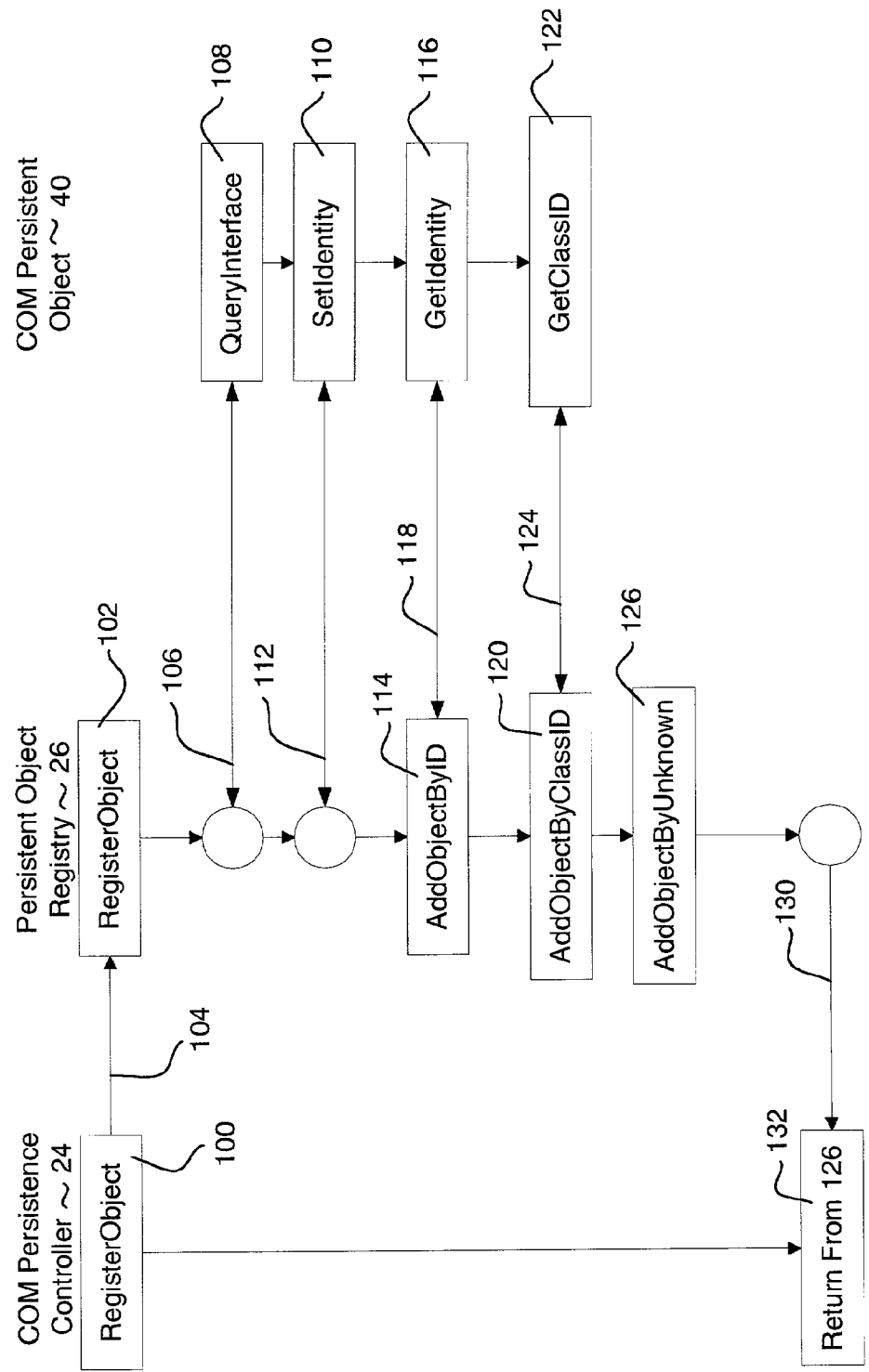
FIG. 2 is an object interaction diagram for adding an illustrative persistent object to a COM persistent object controller.

FIG. 2 illustrates an object interaction diagram (OID) for adding a persistent object to a COM persistent object controller. The OID may be read from left to right and top to bottom, with top to bottom indicating the general order of execution and left to right indicating the calling sequence or method interactions, generally. An object to be registered with the COM persistence controller is passed to COM persistence controller 24 by a client, as indicated at 100. COM persistence controller 24 passes the object to be registered to Persistent Object Registry 26 RegisterObject method 102, as indicated at 104. RegisterObject method 102 is a method from IPersistenceController 22. A client calls this method to register an object that supports being persisted by a COM persistence controller. The object to be registered must support the persistent object interface. RegisterObject method 102 sends a message at 106 to COM persistent object 40, to query interface method 108 to determine if the interface is supported. Next, Persistent Object Registry 26 calls COM persistent object 40 method SetIdentity 110, as indicated at 112. SetIdentity is an implementation of IPersistentObject:SetIdentity. Given an object identifier as input, SetIdentity sets the object ID to the given object identifier. The object ID is a unique identifier for each object. The object ID is returned to Persistent Object Registry 26, as indicated at 112. Persistent Object Registry 26 then calls local method AddObjectByID 114. AddObjectByID is given an IPersistentObject interface and calls IPersistentObject::GetIdentity 116, as indicated at 118. GetIdentity 116 is implemented as a method of COM persistent object 40. GetIdentity 116 is an implementation of IPersistentObject::GetIdentity. After getting the object ID, AddObjectByID method 114 stores a reference to the object by the object ID in Persistent Object Registry 26. Persistent Object Registry 26 then calls AddObjectByClassID method 120, which calls COM persistent object 40 method GetClassID 122, as indicated at 124. GetClassID 122 is an implementation of IPersistStream::GetClassID. GetClassID returns the class ID for the object, as indicated at 124. AddObjectsByClassID 120 then stores or indexes the object to be added by the class ID. Persistent Object Registry 26 calls AddObjectByUnknown method 126. AddObjectByUnknown method 126 is given an IPersistentObject interface and adds the object or indexes the object within Persistent Object Registry 26 by the IUnknown pointer of the object. Persistent Object Registry 26 RegisterObject method 102 returns to 132 as indicated at 130.

Persistent Object Registry 26 maintains at least three collections of all registered persistent objects added using an algorithm such as illustrated in FIG. 2. Persistent Object Registry 26 has an objects-by-ID attribute which is a collection of pointers to all registered persistent objects indexed by their object identifiers, the object ID is added to by the AddObjectByID method 114. The objects-by-class ID attribute is a collection of pointers to all registered persistent objects indexed by their class IDs. ObjectsByclass ID is added to by the AddObjectByClassID method 120. An ObjectsByUnknown attribute is a collection of pointers to all registered persistent objects indexed by their IUnknown pointers. ObjectsByUnknown is added to by AddObjectByUnknown method 126. As each additional object is registered in Persistent Object Registry 126, another attribute of the Persistent Object Registry is affected, the next object ID. The next object ID is the object identifier given to the next object registered by an instance of Persistent Object Registry class 26. It is typically incremented for each object and may be saved and later loaded, allowing an application to continue adding objects to be stored in persistence storage.

Figure 3A:
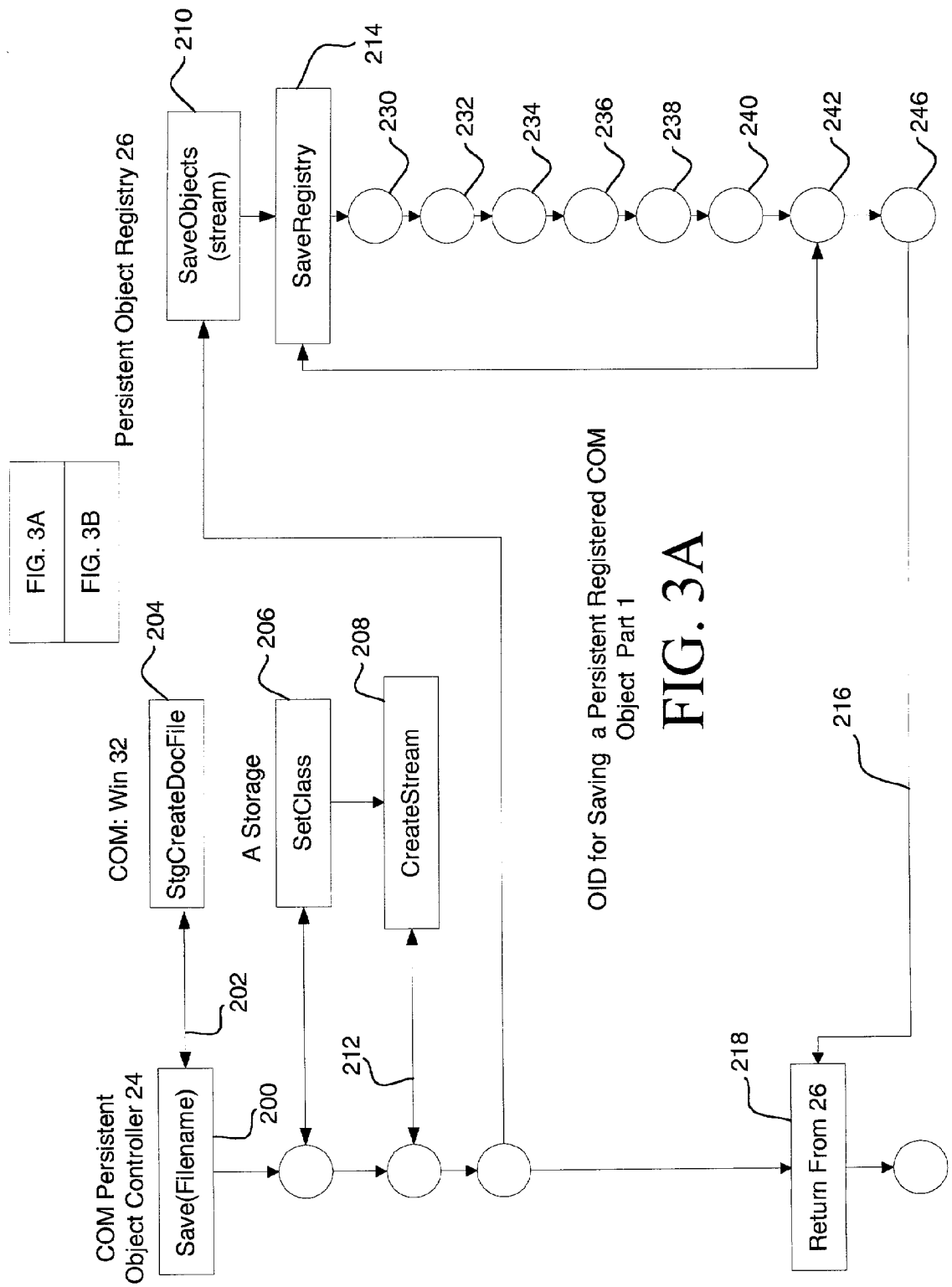

FIGS. 3A–3B are an object interaction diagram for saving a persistent registered COM object. FIG. 3A shows an illustrative process for saving an object registered with Persistent Object Registry 26 to persistence storage. COM Persistent Object Controller 24 calls Save method 200 to save all registered persistent objects known to Persistent Object Registry 26 in a specified file. Save 200 is a method from the standard COM IPersist file. Save 200 controls the streaming of an object state to a COM compound file storage stream. Save 200 creates and opens a COM compound storage and stream. Save 200 registers the class ID of the COM Persistence Controller class 24 with the COM compound file storage. When the file created is later to be loaded, the class ID of COM Persistence Controller class 24 is used to create a copy of COM Persistence Controller 24 using a user-written DLL.

Persistent Object Controller 24 makes a call to create a Storage. In particular, a SetClass method 206 and a CreateStream method 208 are called to create a stream to be used in streaming out the objects. COM Persistence Object Controller 24 then calls SaveObjects method 210 of Persistent Object Registry 26, passing the stream retrieved, as indicated at 212. The SaveObjects method 210, then calls SaveRegistry method 214. SaveRegistry method 214 causes every persistent object held for every class ID in ObjectsByClsID to be written to a given COM compound file storage stream. ObjectsByClsID is a collection in Persistent Object Registry 26 created by AddObjectbyClassID 120 of FIG. 2. There may be multiple objects created of the same class ID within ObjectsByClsID. As an overview, SaveRegistry may save the number of unique class IDs found in ObjectsByClsID, then, for each class ID, the class ID is saved along with the number of objects of that class. SaveRegistry may then iterate through every object for a given class ID, with each object being told to save itself through a call to IPersistStream::Save. SaveRegistry 214 completes as indicated at 216 and returns to COM PersistObject controller 24 save method 200, as indicated at 218.

The steps within SaveRegistry method 214 are indicated as reference numerals 230–242 on FIG. 3A, and are repeated on FIG. 3B and are further explained with reference to FIG. 3B.

FIG. 3B illustrates an object interaction diagram for saving a persistent registered COM object. FIG. 3B illustrates SaveRegistry method 214 in greater detail. In some embodiments of the invention, objects may be stored in any order, with the associated class ID. In a preferred embodiment of the invention, however, the objects stored are grouped by common class ID. In one method, as illustrated in FIG. 3B, the total number or size of objects is first written by SaveRegistry method 214, as indicated at 230. SaveRegistry method 214 writes the size of all objects to a Stream as indicated at 250. WriteSizeofObjects 250 can include writing the total size of all objects to be written to persistence storage. SaveRegistry 214, as indicated at 232, then writes the class ID as indicated at 252. The class ID for each group of objects sharing that class ID may be written at 252. Upon reload, this class ID will be used to load the classes and register the loaded objects with Persistent Object Registry 26. Write step 252 will typically be executed once for each unique class ID having objects to be written.

SaveRegistry method 214, as indicated at 234, may then write the number of objects to be written for a particular class ID at write step 254. Write step 254 is typically executed once for each unique class ID having objects to be stored. SaveRegistry method 214, as indicated at 236, may then call save method 260 of COM Persistent Object 40. Save 260 is a virtual method meant to be overridden by classes derived from COM Persistent Object 40. Save 260 provides derived classes with notification that they should save their state. Derived classes interested in persisting must override save, call COM PersistentObject::Save, and persist their own state. Save, as implemented in COM Persistent Object, saves object ID via the given COM IStream interface. Save method 260, as indicated at 262, however, writes the unique object ID to the stream at Write step 256. After loading, the unique object ID for the object saved will be restored, and may be used to restore pointers pointing to the object, as well. Save method 260 then calls Save1 method 264.

Save1 is an implementation of IPersistStream::Save. Given a COM IStream interface, Save1 calls Save. Save1 is written by the user to stream out the user-defined object, such as illustrated in FIG. 1 at 54. Save method 260, as indicated at 266, then passes a message to COM Persistence Reference 38. COM Persistence Reference 38 then calls Write step 268 to write the smart pointers of the object being stored to the stream. As discussed elsewhere, the smart pointers include, or can include, both the address of the object being pointed to and the object ID of the object being pointed to. In this way, Write step 252 is repeated for each unique class ID having objects to be saved.

Write steps 256 and 258 are iterated through for each object within a class to be written. Write step 268 may be repeated for each smart pointer to be written to the stream. After all objects have been saved, a Write step 270 is executed to write the next object ID to be assigned. The next object ID is typically an integer incremented for every new object added to COM Persistent Object Registry 26. At this point, the saving of the registered COM objects to persistent storage is complete.

Figure 4B:
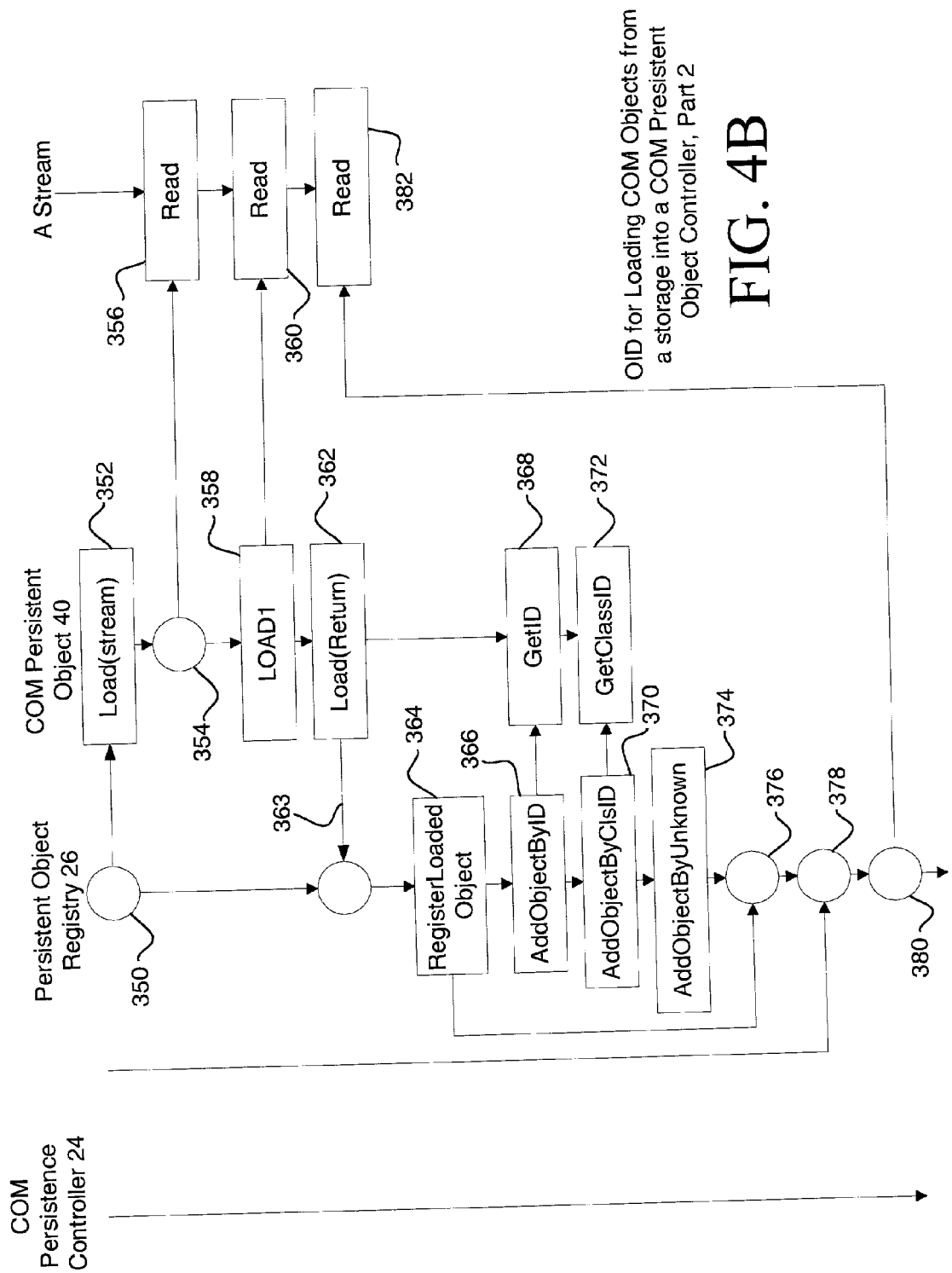
Figure 4C:
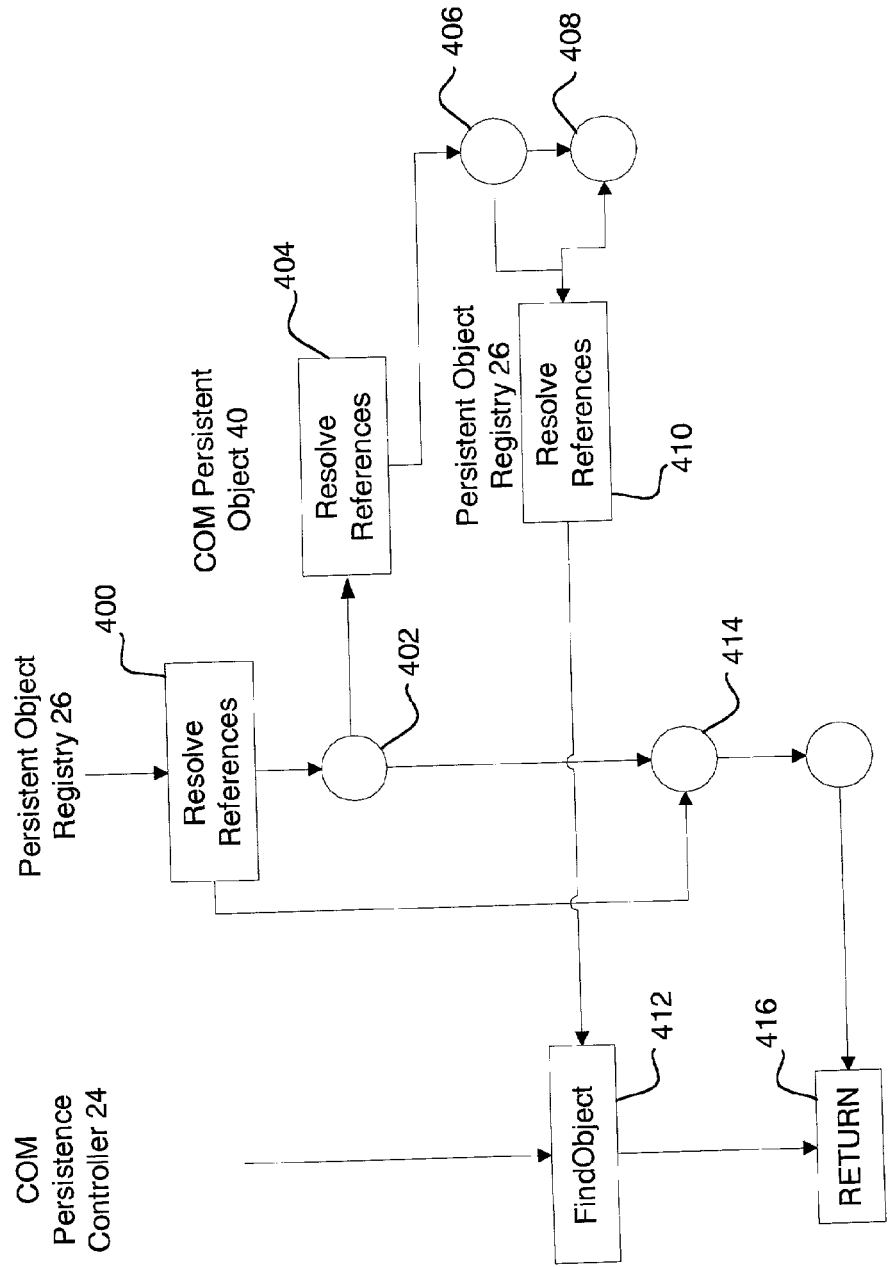

FIGS. 4A–4C are an object interaction diagram for loading COM objects from a Storage into a COM Persistent Object controller. COM Persistence Controller 24 calls a load method 300 which makes a call to an open storage method 302, as indicated at 304. Open Storage method 302 creates an open stream with OpenStream step 306, returning to COM Persistence Controller 24, as indicated at 308. Load method 300, as indicated at 314, calls Persistent Object Registry 26 and LoadObjects method 320.

LoadObjects begins the load process and returns the result of calling subsequent steps. COM Persistence Controller 24 and Load method 300, as indicated at 316, then calls InitCollections step 322 of Persistent Object Registry 26.

InitCollections step 322 initializes a LoadRegistry step 324. LoadRegistry step 324 may then begin, iterating over all classes and objects previously saved. Essentially, the load process loads the objects previously saved, in the order expected. Much of the load process is performed by the Load1 method which is user-supplied, created to load, or stream in the objects previously saved using Save1. At 326, a Read(clsid) step 328 is executed to read the number of unique class IDs previously saved in the storage. As indicated at 330, a Read step 332 is executed to read the class ID for a class having objects stored according to that class. Read step 322 may be expected and be repeated once for each unique class having one or more objects stored that belong to that class. As indicated at 334, a Read step 334 is executed to read the number of objects that are stored for the class ID given in step 332. As indicated at 336, a call is made to CoCreateInstance step 338 to create an instance for the class ID. The load methods within Persistent Object Registry 26 continue at 350 on FIG. 4B.

FIG. 4B illustrates the second part of the load scheme according to the present invention. As indicated at 350, a Load method 352 is called on COM Persistent Object 40, as indicated at 350. Load step 352, as indicated at 354, performs a read on the A Stream, as indicated at 356. Read step 356 reads the unique object ID for the object being loaded, and returns that unique object ID. A Load1 method 358 of COM Persistent Object 40 is then called which in turn calls a Read step 360 on A Stream. Read step 360 reads the object data saved by the user-written Save1 method previously discussed. Load1 is an implementation of IPersistStream:: Load. Given a COM IStream interface, Load calls Load1. Load1 is illustrated as step 358 in FIG. 4B. A Load return step 362 returns control as indicated at 363, indicating that load of the given object is complete.

Persistent Object Registry 26 executes a RegisterLoadedObject step 364. RegisterLoadedObject step 364 adds an object just loaded from Persistence into ObjectsByID, ObjectsByClsID, and ObjectsByUnknown. The process thus followed is similar to the initial registering of newly constructed objects previously discussed. An AddObjectByID step 366 calls a GetID step 368, which returns the object ID. An AddObjectByClsID step 370 calls a GetClassID step 372, which returns the unique class ID for the class of the loaded object. An AddObjectByUnknown step 374 adds the object by unknown into Persistent Object Registry 26, as previously discussed. RegisterLoadedObject step 364 thus iterates over each object, as indicated by 376. LoadRegistry Step 324 of FIG. 4A iterates over all classes having objects, as indicated at 387 in FIG. 4B. After loading all objects, execution proceeds, as indicated at 380, with execution of a Read method on A Stream, as indicated at 382. Read step 382 retrieves the NextObjectID to be used by the Persistent Object Registry 26.

FIG. 4C illustrates the third part of the object interaction diagram for loading COM objects from A Storage into a COM Persistent Object Controller. With all objects loaded into memory, a ResolveReferences step 400 is executed within Persistent Object Registry 26. ResolveReferences step 400 iterates through all references that require resolving. One such reference-resolving step, indicated at 402, calls ResolveReferences 404 of COM Persistent Object 40. Generally, ResolveReferences step 404 is responsible for telling each persistent object to initiate the conversion of persistent object references into actual pointers. ResolveReferences step 404 iterates, as indicated at 406 and 408, through all objects held in ObjectsByID in Persistent Object Registry 26, calling ResolveReferences method 410 of Persistent Object Registry 26. Each smart pointer of an object is thus instructed to use the object's ID held within the smart pointer to retrieve the current address of the object having that object ID from the ObjectsByID collection in Persistent Object Registry 26.

ResolveReferences method 410 calls FindObject method 412 of COM Persistence Controller 24. FindObject is a method from IPersistence Controller. A client calls this method to find a particular persistent object based on an object identifier. FindObject calls PersistentObjectRegistry:: FindObject. The iteration of ResolveReferences method 400 over all objects having such references as indicated at 414 resolves all references. After resolving all references, control is returned at 416 to Load method 300, initially begun on FIG. 4A.

Example Objects and Methods

1 The COM Persistence Controller

The Persistence Controller manages the streaming of persistent objects to and from a COM Compound-File Storage. The COM Persistence Controller is implemented as a stand alone DLL. As such, clients use the COM Persistence Controller to manage the streaming of disparate COM objects to and from a COM Compound-File Storage Stream.

A COM Compound-File Storage is a concept within COM itself. Conceptually, a COM Compound-File Storage can be considered a directory structure. This directory structure is composed of "files" called Streams. The COM Persistence Controller persists objects to a single Stream within a COM Compound-File Storage.

1.1 Persistence Controller Interface (22)

The Persistence Controller Interface (IPersistenceController) is a pure virtual class. IPersistenceController extends the standard COM IPersistFile interface. A class implementing IPersistenceController can respond to normal COM File Moniker operations. The use of a COM File Moniker allows a client program to activate the COM Persistence Controller with only a filename.

1.1.1 SetControllerName

This method allows a caller to set the name for a Persistence Controller. The Persistence Controller uses this name to identify the COM Compound-File Storage Stream.

1.1.2 RegisterObject

This method allows a caller to register an object that supports being streamed by a Persistence Controller.

1.1.3 FindObject

This method allows a caller to find a particular object registered with the Persistence Controller.

1.1.4 EnumObjects

This method allows a caller to enumerate all objects of a particular COM class.

1.2 COM Persistence Controller Class (24)

The COM Persistence Controller class is an implementation of the Persistence Controller Interface. As such, the COM Persistence Controller class supports all methods of IPersistFile and IPersistenceController. In general, the COM Persistence Controller class delegates most of its functionality to the Persistent Object Registry. Section 1.3 describes the operation of the Persistent Object Registry.

1.2.1 Attributes 1.2.1.1 ObjectRegistry

This is an aggregated instance of Persistent Object Registry.

1.2.1.2 Name

This is the name of the COM Persistence Controller. The default name is "-DefaultController-". This attribute becomes the name of the Stream within the COM Compound-File Storage.

1.2.2 Methods 1.2.2.1 Constructo( )

Construct( ) is the constructor for the COM Persistence Controller Class. It is responsible for creating and initializing the ObjectRegistry.

1.2.2.2 Destruct( )

Destruct( ) is the destructor for the COM Persistence Controller Class. It is responsible for destructing the ObjectRegistry.

1.2.2.3 GetClassID( )

This is a method from the standard COM IPersistFile. GetClassID( ) returns the CLSID associated with the COM persistent storage medium. This is always the CLSID of the COM Persistence Controller.

1.2.2.4 IsDirty( )

This is a method from the standard COM IPersistFile. IsDirty( ) returns an indication of whether or not any of the objects have been modified since the last call to Save( ).

1.2.2.5 Load( )

This is a method from the standard COM IPersistFile. Load( ) controls the creation of objects from object state saved in a COM Compound-File Storage Stream.

Load ( ) opens the specified COM Compound-File Storage and Stream. Load( ) then calls PersistentObjectRegistry::LoadObjects( ).

1.2.2.6 Save( )

This is a method from the standard COM IPersistFile. Save( ) controls the streaming of object state to a COM Compound-File Storage Stream.

Save( ) creates and opens a COM Compound-File Storage and Stream. Save( ) registers the CLSID of the COM Persistence Controller class with the COM Compound-File Storage. Save( ) then calls PersistentObjectRegistry::SaveObjects( ).

1.2.2.7 SaveCompleted( )

This is a method from the standard COM IPersistFile. In the most general sense, the semantics of IPersistFile::Save( ) do not require synchronous behavior. A client calls SaveCompleted to get an indication of whether or not an asynchronous save operation is complete. Because all save operations performed by the COM Persistence Controller are synchronous, SaveCompleted( ) always returns true.

1.2.2.8 GetCurFile( )

This is a method from the standard COM IPersistFile. GetCurFile returns the name of the currently open COM Compound-File Storage.

1.2.2.9 SetControllerName( ) This is a method from IPersistenceController. A client calls this method to establish a name of the COM Compound-File Storage Stream to and from which objects are persisted.

1.2.2.10 RegisterObject( )

This is a method from IPersistenceController. A client calls this method to register an object that supports being persisted by a COM Persistence Controller. The object to be registered must support the Persistent Object Interface.

RegisterObject calls PersistentObjectRegistry::RegisterObject.

1.2.2.11 FindObject( )

This is a method from IPersistenceController. A client calls this method to find a particular persistent object based on an object identifier.

FindObject calls PersistentObjectRegistry::FindObject.

1.2.2.12 EnumObjects( )

This is a method from IPersistenceController. A client calls this method to obtain a collection of persistent objects given a CLSID.

EnumObjects calls PersistentObjectRegistry::EnumObjects.

1.3 Persistent ObjectRegistry Class (26)

The Persistent Object Registry class tracks all registered persistent objects. This tracking is done through several different collections.

1.3.1 Attributes 1.3.1.1 Controller

This is a pointer to the IPersistenceController interface supported by an instance of the COM Persistence Controller class aggregating an instance of the Persistent Object Registry class.

1.3.1.2 NextObjectId

This is the object identifier given to the next object registered by an instance of the Persistent Object Registry class.

1.3.1.3 ObjectsById

This is a collection of pointers to all registered persistent objects indexed by their object identifiers.

1.3.1.4 ObjectsByClsid

This is a collection of pointers to all registered persistent objects indexed by their CLSIDs.

1.3.1.5 ObjectsByUnknown

This is a collection of pointers to all registered persistent objects indexed by their IUnknown pointers.

1.3.2 Methods 1.3.2.1 Constructo( )

Construct( ) is the constructor for the Persistent Object Registry Class. Construct( ) is responsible for the construction and initialization of all object attributes.

1.3.2.2 Destruct( )

Destruct( ) is the destructor for the Persistent Object Registry Class. Destruct( ) is responsible for the destruction of all object attributes.

1.3.2.3 RegisterObject( )

RegisterObject( ) validates that the input object supports persistence through the COM Persistence Controller (i.e. the object supports IPersistentObject).

If the object supports persistence through the COM Persistence Controller, RegisterObject assigns the persistent object the object identifier in NextObjectId. RegisterObjecto assigns the object identifier by calling IPersistentObject::SetIdentity( ).

RegisterObjecto increments NextObjectId.

Finally, RegisterObject( ) calls AddObjectById( ), AddObjectByClsid( ), and AddObjectByUnknown( ).

1.3.2.4 FindObject( )

FindObject( ) attempts to find a persistent object given its object identifier. FindObject indexes the ObjectsById collection. FindObject( ) returns the resulting IPersistentObject pointer.

1.3.2.5 EnumObjects( )

EnumObjects( ) returns all persistent objects of a given COM type (CLSID). EnumObjects indexes the ObjectsByClsid collection and returns all the IPersistentObject pointers based the given CLSID.

1.3.2.6 SaveObjects( )

SaveObjects( ) returns the result of calling SaveRegistry( ).

1.3.2.7 LoadObjects( )

LoadObjects( ) returns the result of calling InitializeCollections( ), LoadRegistry( ), and ResolveReferences( ).

1.3.2.8 SaveRegistry( )

SaveRegistry( ) causes every persistent object held for every CLSID in ObjectsByClsid to be written to a given COM Compound-File Storage Stream.

SaveRegistry( ) first saves the number of unique CLSIDs held in ObjectsByClsid.

SaveRegistry( ) then iterates through each CLSID held in ObjectsByClsid. Each CLSID is saved along with the number of objects of that class.

SaveRegistry( ) then iterates through every object of the given CLSID. Each object is told to save itself through a call to IPersistStream::Save( ).

After all objects have been saved, SaveRegistry( ) writes NextObjectId to the COM Compound-File Storage Stream.

1.3.2.9 LoadRegistry( )

LoadRegistry( ) restores objects from state held in a given COM Compound-File Storage Stream.

LoadRegistry( ) first loads the number of unique CLSIDs held in the Compound-File Storage Stream.

Given the number of unique CLSIDs held in persistence, LoadRegistry( ) reads the next CLSID and the number of objects of that type.

Given the number of objects of a given CLSID, LoadRegistry( ) requests that COM create an instance of the given CLSID through a call to CoCreateInstance( ). CoCreateInstance( ) is a standard COM API for creating object instances.

Having created an object of a particular type, LoadRegistry( ) tells the object to load itself through a call to IPersistStream::Load( ).

Once an object has loaded itself, LoadRegistry( ) calls RegisterLoadedObject( ).

After all objects have been loaded, LoadRegistry( ) reads NextObjectId from the COM Compound-File Storage Stream.

1.3.2.10 InitializeCollections( )

InitializeCollections( ) clears the contents of ObjectsById, ObjectsByClsid, and ObjectsByUnknown.

1.3.2.11 RegisterLoadedObject( )

RegisterLoadedObject( ) adds an object just loaded from persistence into ObjectsById, ObjectsByClsid, and ObjectsByUnknown.

1.3.2.12 ResolveReferences( )

Persistent objects can hold references to other persistent objects. When loaded in memory, persistent objects reference other persistent objects with normal pointers. When saved, persistent object references can no longer be normal pointers. Persistent object references become object identifiers.

The process of loading objects from persistence includes turning object identifiers back into pointers.

Each persistent object is responsible for converting any persistent object references into pointers.

ResolveReferences( ) is responsible for telling each persistent object to initiate the conversion of persistent object references into actual pointers.

ResolveReferences( ) iterates through all objects held in ObjectsById calling IPersistentObject::resolveReferences( ).

1.3.2.13 AddObjectById( )

Given an IPersistentObject interface, AddObjectById( ) calls IPersistentObject::GetIdentity( ) to retrieve the object identifier.

AddObjectById( ) then adds the object into ObjectsById based on the object identifier.

1.3.2.14 AddObjectByClsid( )

Given an IPersistentObject interface, AddObjectByClsid( ) calls IPersistentStream::GetClassID( ) to retrieve the CLSID of the object.

AddObjectByClsid( ) then adds the object to ObjectsByClsid based on the CLSID.

1.3.2.15 AddObjectByUnknown( )

Given an IPersistentObject interface, AddObjectByUnknown( ) adds the object to ObjectsByUnknown.

2 COM Persistent Object Support

This section describes interfaces and classes that act as support for persistent COM objects. The use of these classes permits rapid development of COM objects capable of being persisted by the COM Persistence Controller as embodied in the COM Persistence Controller DLL.

2.1 Persistent Object Interface (38)

The Persistent Object Interface (IPersistentObject) is a pure virtual class. IPersistentObject extends the standard COM IPersistStream interface. In general, any COM object supporting IPersistentObject can be persisted by the COM Persistence Controller.

2.1.1 SetIdentity( )

This method allows a caller to assign a persistent object a unique identifier.

2.1.2 GetIdentity( )

This method allows a caller to retrieve the unique identifier of a persistent object.

2.1.3 ResolveReferences( )

This method provides a persistent object with notification that it should resolve references to other persistent objects.

2.2 COM Persistent Object Class (40)

The COM Persistent Object class is an implementation of the Persistent Object Interface. As such, the COM Persistent Object class supports all methods of IPersistStream and IPersistentObject. Furthermore, COM Persistent Object is an abstract base class for all classes of persistent objects.

2.2.1 Attributes

2.2.1.1 ClassId
ClassId holds a reference to the CLSID of this object.

2.2.1.2 IsDirty
IsDirty is a COM HRESULT value that indicates whether or not an object has changed state since the last call to Save1( ). IsDirty can have a value of S_OK, meaning the state has changed since the last call to Save1( ). IsDirty can also have a value of S_FALSE, meaning the state has not changed since the last call to Save1( ). The IsDirty attribute is returned directly from the PersistStream::IsDirty( ) implementation.

2.2.1.3 ObjectId
ObjectId holds the object identifier for this object as established by SetIdentity( ).

2.2.1.4 References
References is a collection of pointers to persistent object references within an object. That is, References is a collection of pointers to object derived from the ComPersistenceRefenceBase class. This collection of persistent object reference pointers is used during the persistent object reference resolution process. This process is initiated through IPersistentObject::ResolveRefererence( ).

2.2.2 Methods

2.2.2.1 Constructo( )
Construct( ) is the constructor for the COM Persistent Object Class. Construct( ) takes one parameter, the CLSID of the persistent COM class derived from the COM Persistent Object class. Constructo initializes all object attributes.

2.2.2.2 Destruct( )
Destruct( ) is the destructor for the COM Persistent Object class. Destruct( ) destroys all object attributes.

2.2.2.3 AddReference( )
AddReference( ) provides a means by which instances of classes derived from COM Persistent Reference Base can register themselves as belonging to this COM Persistent Object instance.

Given a persistent object reference, AddReference( ) add a pointer to the persistent object reference to References.

2.2.2.4 RemoveReference( )
RemoveReference( ) provides a means by which instances of classes derived from COM Persistent Reference Base can deregister themselves as belonging to this COM Persistent Object instance.

Given a persistent object reference, RemoveReference( ) deletes the pointer to the persistent object reference from References.

2.2.2.5 Load( )
Load( ) is a virtual method meant to be overridden by classes derived from COM Persistent Object.

Load( ) provides derived classes with notification that they should load their state. Derived classes interested in retrieving persistent state must override Load( ), call ComPersistentObject::Load( ), and retrieve their own state.

Load( ), as implemented in COM Persistent Object, loads ObjectId via the given COM IStream interface.

2.2.2.6 Save( )
Save( ) is a virtual method meant to be overridden by classes derived from COM Persistent Object.

Save( ) provides derived classes with notification that they should save their state. Derived classes interested in persisting state must override Save( ), call ComPersistentObject::Save( ), and persist their own state.

Save( ), as implemented in COM Persistent Object, saves ObjectId via the given COM IStream interface.

2.2.2.7 Invalidate( )
Invalidate( ) provides a means by which classes derived from COM Persistent Object set the IsDirty flag.

Invalidate( ) sets IsDirty to S_OK.

2.2.2.8 IsValid( )
IsValid( ) provides a means by which classes derived from COM Persistent Object can test the IsDirty flag.

IsValid( ) returns IsDirty !=S_OK.

2.2.2.9 GetClassID( )
GetClassID( ) is an implementation of IPersistStream::GetClassID( ).

GetClassID( ) returns ClassID.

2.2.2.10 IsDirty( )
IsDirty( ) is an implementation of IPersistStream::IsDirty( ).

IsDirty( ) returns IsDirty.

2.2.2.11 Save1( )
Save1( ) is an implementation of IPersistStream::Save( ).

Given a COM IStream interface, Save1( ) calls Save( ) if IsValid( ) returns false.

Save1( ) also sets IsDirty appropriately as per the fClearDirty parameter.

2.2.2.12 Load1( )
Load1( ) is an implementation of IPersistStream::Load( ).

Given a COM IStream interface, Load1 call Load( ).

2.2.2.13 GetMaxSize( )
GetMaxSize( ) is an implementation of IPersistStream::GetMaxSize( ).

GetMaxSize( ) is an optionally implemented method.

GetMaxSize( ) return the COM status of E_NOTIMPL.

2.2.2.14 SetIdentity( )
SetIdentity( ) is an implementation of IPersistentObject::SetIdentity( ). Given an object identifier as input, SetIdentity( ) sets ObjectID to the given object identifier.

2.2.2.15 GetIdentity( )
GetIdentity( ) is an implementation of IPersistentObject::GetIdentity( ).

GetIdentity( ) return ObjectID.

2.2.2.16 ResolveReferences( )
ResolveReferences( ) is an implementation of IPersistentObject::ResolveReferences( ).

For each persistent object reference held in References, ResolveReferences( ) calls ComPersistentReferenceBase::ResolveReference( ) passing the input IPersistenController interface.

2.3 COM PersistentReferenceBase Class (48)

The COM Persistent Reference Base class is the base class for all classes that implement references to COM Persistent Objects. In general, COM Persistent Reference Base defines the general protocol used to maintain persistent object references.

2.3.1 Attributes

2.3.1.1 Owner

This is a pointer to the COM Persistent Object instance that owns this COM Persistent Reference Base instance.

2.3.1.2 PointeeIdentity

This is the object identifier of the referenced persistent object. Pointee Identity is established when a derived class is constructed, or when a derived class assigns a new persistent object reference.

2.3.2 Methods

2.3.2.1 Constructo( )

Contructo( ) is the default constructor. It takes two parameters. The first parameter is a COM Persistent Object pointer that will be assigned as Owner. The second parameter is the object identifier of COM Persistent Object being referenced.

Upon construction, Owner is set to the input owner. Pointee Identity is set to the input pointee identity, and Owner.AddReference( ) is called.

2.3.2.2 ConstructCopy( )

ConstructCopy( ) is the copy constructor. When a new COM Persistent Reference Base is created from another instance, the Owner and Pointee Identifier are copied from the source instance.

Owner.AddReference( ) is also called.

2.3.2.3 Assign( )

Assign( ) is the assignment operator. When an existing COM Persistent Reference Base is assigned from another instance, Owner.RemoveReference( ) is called, Owner and Pointee Identifier are copied from the source instance, and Owner.AddReference( ) is called.

2.3.2.4 Destruct( )

Destruct( ) is the destructor. When an existing COM Persistent Reference Base is destroyed, Owner.RemoveReference( ) is called.

2.3.2.5 ResolveReference( )

ResolveReference( ) is a virtual method that is to be overridden by a derived class.

ResolveReference( ) takes an IPersistenceController as input. The implementation of ResolveReference( ) within this class calls IPersistenceController::FindObject( ) passing PointeeIdentity. ResolveReference( ) returns the result of this call.

2.3.2.6 SetIdentity( )

SetIdentity( ) takes as input the object identifier that will be assigned to PointeeIdentity.

A derived class calls this method whenever the derived class changes the value of its persistent object reference outside of assignment of Com Persistent Reference Base.

SetIdentity( ) sets Pointee Identity to the input object identifier.

2.3.2.7 StreamOut( )

StreamOut( ) is the C++ operator <<( ) member function.

StreamOut( ) takes one parameter as input, the COM stream to which object state is to be written.

When called, StreamOut( ) writes PointeeIdentity to the COM stream.

2.3.2.8 StreamIn( )

StreamIn( ) is the C++ operator >>( ) member function. StreamIn( ) takes one parameter as input, the COM stream from which object state is to be obtained.

When called, StreamIn( ) reads PointeeIdentity from the COM stream.

2.4 COM Persistent Reference Class (46)

COM Persistent Reference class is a template class that provides a concrete implementation of a COM persistent reference. That is, the COM Persistent Reference class essentially implements a COM persistent pointer. Template parameters include the COM interface type and pointer to the COM interface IID.

2.4.1 Attributes

2.4.1.1 Pointee

Pointee is of type ATL CComptr<Interface>.

Pointee holds the reference to an actual COM interface supported by a persistent COM object.

2.4.2 Methods

2.4.2.1 Constructo( )

Constructo( ) is the default constructor. It takes two parameters. The first parameter is a pointer to a COM Persistent Object that will be assigned as Owner in the base class. The second parameter is an interface pointer to the persistent object.

Constructo( ) passes the COM Persistent Object pointer to the base class Constructo( ) along with the result of calling GenerateIdentity( ) against the input interface pointer. Pointee is also initialized with the input interface pointer.

2.4.2.2 ConstructCopy( )

ConstructCopy( ) is the copy constructor. ConstructCopy( ) invokes the base class ConstructCopy( ) with source object. ConstructCopy( ) also copies Pointee from the source object.

2.4.2.3 Assigno( )

Assigno( ) is the assignment operator taking a COM Persistent Reference object as an input parameter.

Assigno( ) validates that the source object is not the target object.

Assigno( ) then invokes the base class Assign( ) with the source object.

Assingo( ) assigns Pointee from the source object to the target object.

2.4.2.4 Assign1( )

Assign1( ) is the assignment operator taking an interface pointer as an input parameter.

Assign1( ) assigns Pointee from the source interface pointer.

Assing1( ) calls SetIdentity( ) with the result of calling GenerateIdentity( ) using the source interface pointer as input.

2.4.2.5 Destruct( )

Destruct( ) is the destructor. It destructs the Pointee and invokes the base class Destruct( ).

2.4.2.6 Dereferenceo( )

This is the C++ operator ->( ) member function.

It Dereferenceo( ) returns Pointee::operator ->( ).

2.4.2.7 Dereference1( )

This is the C++ operator *( ) member function.

Dereference1( ) returns Pointee::operator *( ).

2.4.2.8 Converto( )

This is the C++ operator Pointee *( ).

Converto( ) returns Pointee::operator Pointee *( ).

2.4.2.9 ResolveReference( )

ResolveReference( ) is called to reestablish Pointee following a load of state from persistence.

ResolveReference( ) calls the base class ResolveReference( ) which returns an IPersistentObject pointer.

ResolveReference( ) queries the returned interface pointer for the interface to which the COM Persistent Reference is associated.

The result of the query is stored into Pointee.

2.4.2.10 GenerateIdentity( )

GenerateIdentity( ) is a private member function.

GenerateIdentity( ), given a COM interface pointer, queries for IPersistentObject.

GenerateIdentity( ) then calls IPersistentObject::getIdentity( ) and returns the result.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for creating a plurality of objects from data in persistent storage, the objects having object pointers, unique object identifiers, and object types as attributes, the method comprising the steps of:

reading the total number of type sets;

for each type set, reading the total number of objects in each type set;

for each object in said type set, creating an object from said data in persistent storage;

for each object pointer in said objects, obtaining the unique object identifier corresponding to said object pointer; and for each obtained unique object identifier, obtaining the object address corresponding to said unique object identifier and setting each of said object pointers to said corresponding object addresses.

2. A method as recited in claim 1, wherein said objects are created in a first pass and said objects' pointers values are set in a second pass subsequent to said first pass.

3. A method as recited in claim 1, wherein for each of said object pointers in each of said objects:

attempting to obtain said object addresses, and setting said object pointers equal to said object address if said pointed to objects exist, otherwise deferring said setting object pointer step until said object exists.

4. A method for writing a plurality of objects in non-persistent storage to persistent storage, the objects having pointers to objects, unique object identifiers, and object types as attributes, the method comprising the steps of:

providing one or more common interfaces that are used by each of the plurality of objects to write the objects from non-persistent storage to persistent storage;

grouping together said objects into type sets, wherein each of said objects in each of said type sets have the same type, wherein each of said type sets have a set population equal to a total number of objects inhabiting said type set;

counting each of said type sets and arriving at a total number of sets;

converting each of said objects to a persistable form including obtaining a persistable form for each of said pointers to objects by obtaining a unique object identifier corresponding to each of said pointers to objects;

writing said total number of type sets to persistent storage using, either directly or indirectly, one or more of the common interfaces; and writing each of said type sets to persistent storage using, either directly or indirectly, one or more of the common interfaces.

5. A method for storing and restoring user objects to persistent storage, the method comprising the steps of:

providing one or more common interfaces that are used by the user objects to store and restore the objects to/from persistent storage;

creating a persistence controller object for managing the persistence of the user objects, the persistence controller object being derived from at least one of the common interfaces;

providing a plurality of user defined classes, the classes derived from a common object base class;

creating a plurality of instances of user objects belonging to the user defined classes;

providing a stream-in method and a stream-out method for each of the user defined classes;

registering each added user defined class and added user object in a registry;

grouping the objects according to class;

storing the grouped user objects to persistent storage using either directly or indirectly the persistence controller object and the stream-out methods of the user defined classes;

loading the stored objects from storage into memory using either directly or indirectly the persistence controller object and the stream-in methods of the user defined classes; and registering the user objects in the registry.

6. A method as in claim 5, wherein at least some of the user defined classes have pointers pointing at objects derived from the base class, wherein, when the pointers have a unique identifier associated with the pointer, wherein the saving step includes saving the unique identifiers associated with the pointers, and wherein the loading step includes setting the unique identifier value for each loaded object, obtaining the new address of each loaded user object, and using the stored unique identifier associated with each pointer along with the new address to set each pointer value to the new address.

7. A computer readable medium encoded with an object for persistent storage, the object having a smart pointer, wherein the smart pointer includes an address attribute for containing an address of a subject object being pointed to by the smart pointer, and an object unique identifier attribute for containing a unique identifier for the subject object being pointed to, wherein the object smart pointer has an assignment operation which correlates the address of the subject object being pointed to and the unique identifier of the subject object being pointed to, and wherein the object includes a load method for using the smart pointer unique identifier attribute to determine and load a new smart pointer address attribute for the subject object being pointed to after the subject object is loaded from persistent storage.

8. An object as in claim 7, wherein the object includes a stream-out method for streaming out the smart pointer address attribute and/or the unique identifier attribute to persistent storage.

9. A method for writing computer objects to persistent storage, the method including the steps of:
- providing a plurality of software objects to be stored, wherein the objects are instantiations of at least one class to be storable, wherein the storage is in persistent storage, wherein each of the classes has a unique class ID, and wherein each of the objects has a unique object ID;
- providing smart pointers for at least some objects, wherein the smart pointers include an address portion to contain the address of the object being pointed to and an object identifier portion to contain an object identifier of the object being pointed to;
- providing a persistent object controller for controlling the lifecycle of objects to be saved to persistent storage and loaded from persistent storage;
- providing a Persistent Object Registry for maintaining a database of objects to be saved to persistent storage, wherein the Persistent Object Registry is in communication with the persistent controller object;
- providing a first save method to save all objects in the Persistent Object Registry to persistent storage;
- providing a second save method for saving the attributes of each class having objects to be saved to persistent storage, wherein the second save method is called by the first save method;
- providing a first load method for loading all objects saved in a file in persistent storage;
- providing a second load method for loading the attributes of each class having objects to be loaded from persistent storage, wherein the second load method is called by the first load method;
- registering the objects to be saved with the Persistent Object Registry using the persistent object controller, including storing the class ID and object ID of the objects to be saved;
- writing the objects to be saved to persistent storage using the first save method and second save method;
- reading the objects stored from persistent storage using the first load method and second load method;
- registering the objects loaded into the Persistent Object Registry; and
- resolving the smart pointer object address attributes by using the object ID attribute value to search the Persistent Object Registry to retrieve the current address of the object being pointed to.

10. A method as in claim 9, wherein the objects are all Component Object Model (COM) objects.

11. A method for managing persistent object lifecycles, the method comprising the steps of:
- providing for each object a unique object identifier attribute, an object type attribute, and an object address;
- providing an object registry object for maintaining a correspondence between said unique object identifier attribute, said object address, and said object type attributes;
- creating a first object having a first object type, a first object address, and a first unique object identifier, and storing said first unique object identifier, address, and type in said object registry;
- creating a second object having a second object type, a second object address, and a second unique object identifier, and storing said second unique object identifier, address, and type in said object registry, said second object having a pointer attribute set equal to said first object address;
- providing said second object pointer attribute to said object registry and obtaining said first object unique identifier corresponding to said second object pointer attribute in return;
- writing said second object to persistent storage as second object data, and writing said first object unique identifier corresponding to said second object pointer attribute to persistent storage, such that said written first object unique identifier is associated with said second object pointer attribute in persistent storage;
- deleting said second object from non-persistent storage;
- reading said second object data from persistent storage and creating said second object having said second object type;
- reading said first object unique identifier associated with said second object data from persistent storage;
- providing said object registry with said first object unique identifier and obtaining said first object address in return; and
- setting said second object pointer attribute equal to said first object address, such that said second object pointer attribute again points to said first object.

12. A method for writing a plurality of objects in non-persistent storage to persistent storage, the method comprising the steps of:
- providing one or more common object interfaces that are used by each of the plurality of objects to write the objects from non-persistent storage to persistent storage;
- each of the common object interfaces having a corresponding common object class;
- providing a Persistent Object Registry for maintaining a listing of objects to be saved to persistent storage, wherein the Persistent Object Registry is in communication with a persistent controller object, and the persistent controller object is derived from one or more of the common object classes;
- providing a save method to save all objects in the Persistent Object Registry to persistent storage; and
- saving objects in the Persistent Object Registry to persistent storage using the save method.

13. The method of claim 12 wherein each of the plurality of objects are derived from one or more of the common object classes.

14. The method of claim 12 further comprising the step of assigning a unique object ID to at least some of the objects.

15. The method of claim 14 wherein at least some of the objects have pointers to other objects, the method further comprising the step of identifying and recording the unique object ID of the other objects referenced by the pointers.

16. The method of claim 15 further comprising the step of saving the recorded unique object IDs of the other objects referenced by the pointers to persistent storage.

17. The method of claim 12 wherein the common object interfaces are COM interfaces including an IPersistFile interface, an IPersistStream and an IUnknown interface.

18. A method for reading a plurality of objects from persistent storage to non-persistent storage, the method comprising the steps of:
- providing one or more common object interfaces that are used by each of the plurality of objects to load the objects from persistent storage to non-persistent storage;
- each of the common object interfaces having a corresponding common object class;
- providing a Persistent Object Registry for maintaining a listing of objects that are loaded from persistent storage, wherein the Persistent Object Registry is in communication with a persistent controller object, and the persistent controller object is derived from one or more of the common object classes;

providing a load method to load objects in the Persistent Object Registry to non-persistent storage; and loading objects to non-persistent storage using the load method.

19. The method of claim 18 wherein each of the plurality of objects are derived from one or more of the common object classes.

20. The method of claim 18 further comprising the step of assigning a unique object ID to at least some of the objects.

21. The method of claim 20 wherein at least some of the objects have pointers to other objects, the method further comprising the step of identifying and recording the unique object ID of the other objects referenced by the pointers.

22. The method of claim 21 further comprising the step of loading the recorded unique object IDs of the other objects referenced by the pointers from persistent storage.

23. The method of claim 18 wherein the common object interfaces are COM interfaces including an IPersistFile interface, an IPersistStream and an IUnknown interface.

24. A method for storing and restoring user objects to persistent storage, the method comprising the steps of:

providing one or more Component Object Model (COM) interfaces that are used by the user objects to store and restore the objects to/from persistent storage, the one or more COM interfaces including a Persistent Object Interface derived from the IPersistStream class, and a Persistent Controller Interface derived from the IPersistFile class of the Component Object Model (COM);

creating a COM Persistence Controller object for managing the persistence of the user objects, the COM Persistence Controller object being derived from the Persistent Controller Interface;

providing a plurality of user defined classes, the classes derived either directly or indirectly from the Persistent Object Interface;

creating a plurality of instances of user objects belonging to the user defined classes; and providing a stream-in method and a stream-out method for each of the user defined classes.

* * * * *